Feb. 22, 1966           A. P. MARTIN           3,237,081

POWER AND VOLTAGE REGULATOR CIRCUIT

Filed Oct. 23, 1961           4 Sheets-Sheet 3

INVENTOR.
Alfred P. Martin
BY Wallenstein,
Spangenberg &
Hattis Attys

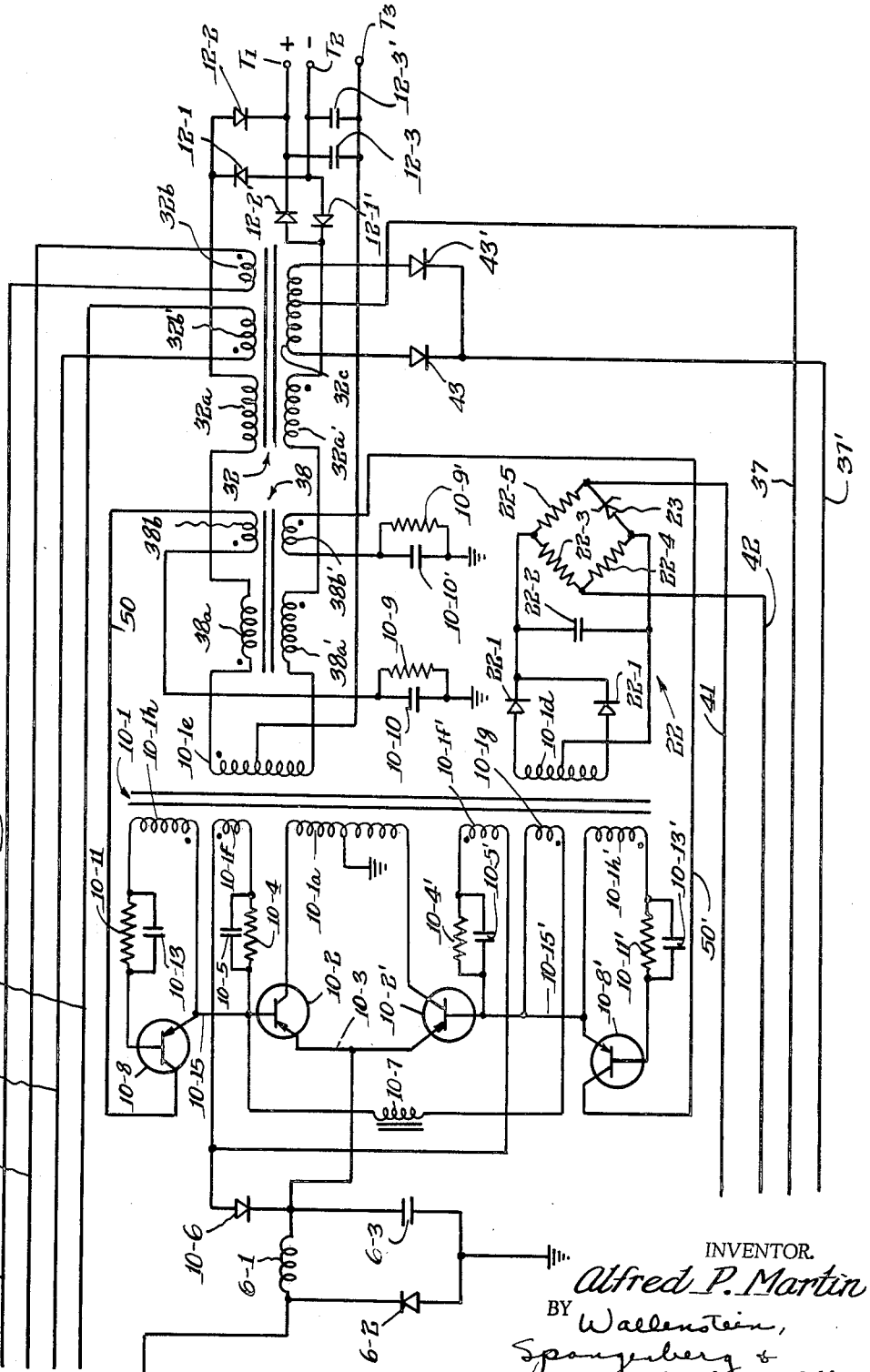

United States Patent Office 3,237,081
Patented Feb. 22, 1966

3,237,081
POWER AND VOLTAGE REGULATOR CIRCUIT
Alfred P. Martin, Gardena, Calif., assignor to Gulton Industries, Inc., Metuchen, N.J., a corporation of New Jersey
Filed Oct. 23, 1961, Ser. No. 146,905
9 Claims. (Cl. 321—18)

This invention relates generally to power and voltage regulator circuits, particularly to circuits using solid state components substantially throughout, such as transistors, gated diodes, magnetic core elements, or the like, although some aspects of the invention have a broader application. The present invention has its greatest utility in controlling relatively large amounts of direct current (D.C.) power to provide a highly efficient and closely regulated power supply circuit providing either a direct current (D.C.) or an alternating current (A.C.) output from a D.C. power source, such as a battery.

One way of providing a regulated D.C. output in a D.C. power supply is to insert a current control device in series with the output of the main D.C. power source, the current control device being used as a gating device which is alternately rendered conductive and non-conductive for varying relative time durations depending upon the output of the power supply. A filter circuit is connected to the output of the gating device for converting pulsating D.C. current to a relatively stabilized D.C. current. Such a voltage regulating system offers many problems with regard to the obtainment of high efficiencies which can be quite serious, as for example, in applications where only a limited electrical energy source is available, such as a battery source in a satellite telemetering system and the like. Problems are also present in connection with the provision of short circuit and overvoltage protection.

It is an object of the present invention to provide a power or voltage regulator circuit which provides regulation with high efficiency by the gating technique just described. A related object of the invention is to provide a regulator circuit as just described in which short circuit and overvoltage protection is simply achieved. A still further object of the present invention is to provide a regulator circuit as just deescribed which can selectively provide a regulated D.C. output or a regulated A.C. output. Still another object of the preesnt invention is to provide a regulator circuit as just described which includes an inverter circuit using power transistors, and wherein the inverter circuit requires a minimum number of power transistors.

An overall object of the present invention is to provide a regulator circuit having one or more of the features just described and which utilizes semiconductor devices, such as transistors and silicon control rectifiers (also referred to as gated diodes) or the like as switching elements, and further wherein the switching devices are turned on and off quickly to minimize power loss during the switching intervals.

In accordance with one aspect of the present invention, for either D.C. or A.C. power supplies the aforesaid filter circuit connection to the output of the gating current control device utilized as the power supply of an inverter circuit which converts the D.C. input thereof to an alternating current (A.C.), preferably a square wave A.C., whose amplitude is a function of the magnitude of the D.C. input to the inverter circuit. The inverter circuit is most advantageously a free running multivibrator type circuit which, in the case of an A.C. power supply, is synchronized to a desirable frequency in any siutable way. In the case of a D.C. power supply, a rectifier and filter circuit is connected to the output of the inverter circuit to convert the A.C. to D.C.

An important aspect of the invention is the utilization of the output of the inverter circuit as the drive power for the gating current control device, which is preferably a power transistor. The transistor or other current control device is preferably rendered conductive preferably during each half cycle of the inverter output for variable intervals which depend upon the regulation requirements of the power supply.

In accordance with a specific aspect of the invention, the means for controlling the duration of the conducting intervals of the gating current control device include one or more gated diodes which are semiconductor devices analogous to thyratron tubes. A pair of gated diodes are used where the gating current control device is to be rendered conductive each half cycle of the inverter circuit output. The anode and cathode terminals of the respective gated diodes are connected in series between the base terminal of the gating current control device and oppositly phased outputs of the inverter circuit. The gated diodes are thereby prepared for conduction respectively during different half cycles of the inverter output. The fast turn off of the gated diodes is assured by the reversal of polarity of the inverter output. The firing angle of the gated diodes are controlled preferably through a variable phase pulse generating circuit comprising a magnetic core control circuit having gating windings fed from the inverter circuit output and control windings fed from a bridge or other voltage sensing circuit which senses the difference between the output of the inverter circuit and a reference voltage which can be simply obtained by the use of a Zener diode.

In accordance with still another aspect of the present invention, when the load current drain on the power supply circuit exceeds a given predetermined level, the impedance level of the drive circuit for the gating current control device is lowered to increase the average level of the drive power thereto.

Very high efficiencies are provided by obtaining the drive power for the gating current control device from the output of the inverter circuit and by utilizing the fast acting gated diodes or the like for controlling the initiation of the conducting intervals of the gating current control device. The circuit just described also provides overvoltage protection for current control devices used in the inverter circuit and the load supplied thereby. The coupling of a dangerously high input D.C. voltage to the inverter or the load circuit is prevented by the resulting non-conduction of the gating current control device. Also, the drive power requirements for the gating current control device decrease with increase of the magnitude of the output of the main D.C. input power source, which contributes to the obtainment of a consistent high efficiency for a wide range of input D.C. supply voltages.

The aforementioned inverter circuit most advantageously utilizes an inverter transformer having a center tapped primary winding whose opposite ends are connected through high current capacity electronic switches to the output of the filter circuit connected to the gating current control device referred to. Where the electronic switches are power transistors, the base electrodes thereof are preferably connected to feedback windings constituting secondary windings on the inverter transformer, so that a saturable core type multivibrator circuit results.

In accordance with still another aspect of the present invention, current feedback is utilized to the base circuits of each of the inverter power transistors which varies the drive power thereto in accordance with the load requirements. Most advantageously, a low power control transistor is provided for each inverter power transistor, and the emitter and collector terminals thereof are connected in series between the base terminals of the associated inverter transistor and the secondary winding of a current transformer whose primary winding carries load current of the power supply circuit. As the load requirements increase, the base current to the inverter power transistors will automatically increase along with the load. The base terminals of the control transistors are connected to secondary windings of the inverter transformer so that the control transistors are rendered conductive and non-conductive along with the associated inverter transistor.

Other objects, advantages and features of the present invention will become apparent upon making reference to the specification to follow, the claims and the drawings wherein:

FIGS. 3 and 3A together form a detailed circuit diagram of that part of FIG. 2 which supplies a regulated D.C. output.

Figure 1:
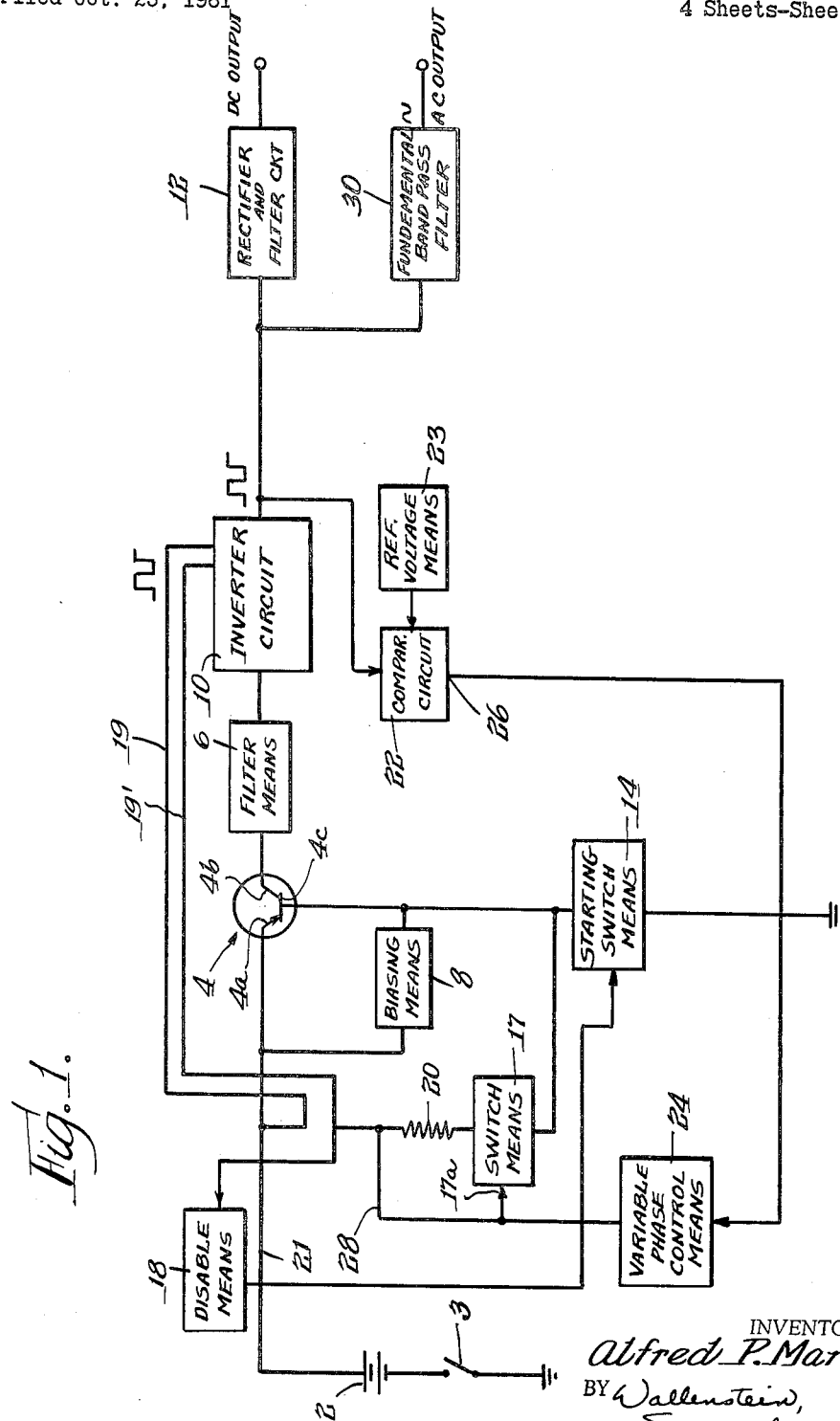
FIG. 1 is a basic box diagram of a simplified form of the present invention.

Referring now to FIG. 1, the power supply circuit illustrated has a primary power source in the form of a battery 2 connected in series with a line switch 3 and a gating current control device 4 shown as a PNP transistor having an emitter electrode 4a, a collector electrode 4b and a base electrode 4c. The negative terminal of the battery is connected to gound through the switch 3. The positive terminal of the battery is connected to the emitter electrode 4a, and the collector electrode is connected to the input of a suitable filter means 6 which converts a pulsating D.C. to a fairly stable D.C. The conduction and non-conduction of the transistor 4 is controlled by various circuit means associated with the base electrode 4c thereof to be described in detail hereinafter.

Biasing means generally indicated by reference numeral 8 is connected between the base and emitter electrodes of the transistor 4 normally to feed a positive voltage to the base electrode to render the PNP transistor non-conductive. Periodically, the effect of the biasing means 8 is overcome by means to be described, the duration of each conductive interval being determined by the output conditions of the regulated power supply circuit being described.

In accordance with one aspect of the present invention, the output of the filter means 6 is utilized as the power supply input of an inverter circuit 10 which converts the D.C. input thereof to an A.C. output, preferably a square wave A.C., at a fixed frequency, the amplitude of such output being dependent upon the amplitude of the D.C. input supply voltage thereto. Most advantageously, the inverter circuit 10 is a synchronized multivibrator circuit. In the case where the invention is applied to a regulated D.C. power supply circuit, the square wave output of the inverter circuit 10 is fed to the input of a rectifier and filter circuit 12 which provides a D.C. voltage proportional to the amplitude of the square wave output of the inverter circuit 10.

The drive power for rendering the gating transistor 4 conductive is obtained from the output of the inverter circuit 10. When the line switch 3 is initially closed to connect the battery 2 in series with the transistor 4, since the inverter circuit 10 is not then in operation there will normally be insufficient power available to render the transistor 4 highly conductive to couple the full voltage of the battery source 2 through the filter means 6 to the input of the multivibrator inverter circuit 10 to start the same into operation. Starting switch means 14 is, accordingly, connected between the base electrode 4c and ground to couple ground potential to the base electrode 4c when the same is closed. Starting switch means 14 may be a normally open manual pushbutton switch or it may be an electronic switch circuit to be described. In either event, once the inverter circuit starts operating, the switch means acts as an open circuit and the drive power for rendering the transistor 4 conductive then comes from the output of the inverter circuit 10 under control of switch means 17 to be described. When the starting switch means 14 is an electronic switch circuit, an automatic electrical disabling means 18 operates to disable the starting switch means once the inverter circuit 10 begins to operate.

The drive power for rendering the transistor 4 conductive in FIG. 1 is coupled to the base circuit thereof as by a pair of conductors 19–19'. The voltage on the conductors is negative during alternate half cycles and positive during the intervening half cycles. Conductor 19 is connected to a line 21 forming a positive voltage bus extending between the emitter electrode 4a of the transistor 4 and the positive battery terminal. The conductor 19' is connected through a resistor 20 or other impedance means to switch means 17. Switch means 17, which is most advantageously a silicon control rectifier, also known as a gated diode, is normally in a non-conductive state even when the polarity of the A.C. voltage coupled in series therewith by the conductors 19–19' is in a direction which would effect the low impedance condition of the switching means 17. In order to render the switch means 17 conductive, it is necessary to feed a switch opening voltage to a control input 17a. The phase of this control signal is rendered variable by means of a variable phase control means 24 which responds to the output conditions of the power supply circuit.

In the particular form of the invention shown in FIG. 1, the output of the power supply circuit is controlled from an output of the inverter circuit 10. This output is fed to a comparator circuit 22 which compares the amplitude of the output of the inverter circuit 10 with a fixed or reference voltage source generally indicated by reference numeral 23. An error or correction signal is produced at an output 26 of the comparator circuit which is a function of the difference between the reference voltage level and the amplitude of the output of the inverter circuit 10. The error signal at the output 26 is connected to the variable phase control means 24 to control the phase of the output thereof to maintain a substantially fixed inverter output voltage.

The variable phase control means 24 is connected in circuit with the A.C. output of the inverter circuit 10 as by connection 28 shown in FIG. 1, so that the variable phase control means 24 may be synchronized to the output of the inverter circuit 10. During alternate half cycles of the inverter circuit output, the variable phase control means 24 produces a pulse or other signal which will close switch means 17 for an interval which is dependent upon the error signal fed thereto from the output of the comparator circuit 22. Rendering the switch means 17 conductive will couple a negative drive voltage on the lines 19–19' to the base electrode 4c to effect conduction thereof for the remainder of the half cycle involved.

The circuit just described is a half wave circuit where the transistor 4 is rendered conductive during alternate half cycles. By adding additional connections to the inverter output and additional switch means 17, a full wave rectifier circuit is obtained wherein the transistor 4 is rendered conductive during each half cycle of the inverter circuit output.

The power supply circuit shown in FIG. 1 is adapted readily to produce a regulated sine wave output by connecting the output of the inverter circuit 10 to a band pass filter 30 which filters out all but the fundamental frequency of the square wave output of the inverter circuit. For this application of the invention it is particularly important to synchronize the inverter circuit 10 in any well known manner to the desired frequency.

Figure 2:
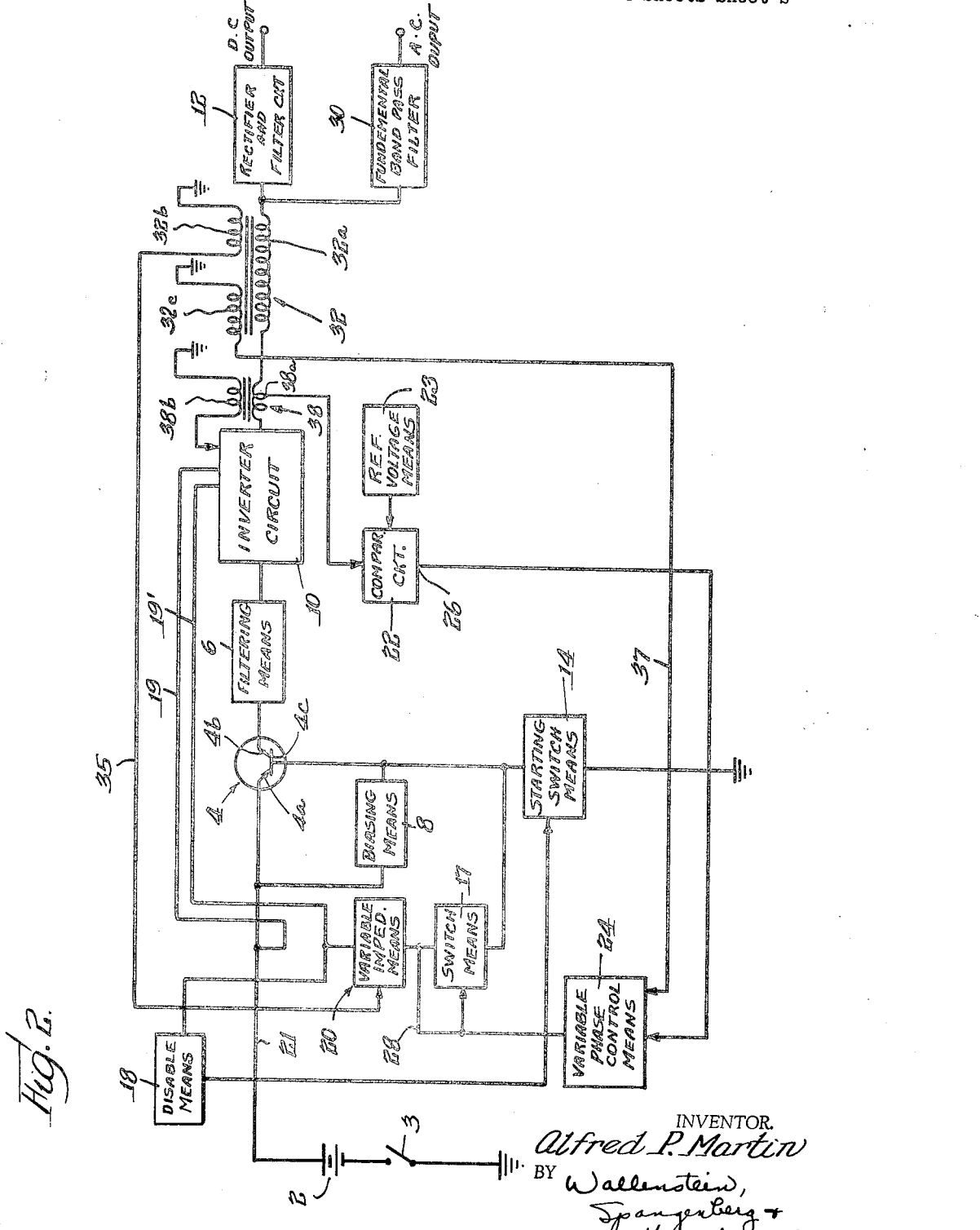
FIG. 2 is a box diagram illustrating the most preferred form of the present invention.

Refer now to FIG. 2 which represents an improvement in the circuit of FIG. 1 due to the addition of various features now to be described. It should be noted that the corresponding portions of the circuits of FIGS. 1 and 2 have been similarly numbered.

One of the most significant additions to the circuit of FIG. 2 is current feedback to various portions of the base electrode control circuit for the gating transistor 4. To this end, a current transformer generally indicated by reference numeral 32 is provided through which load current passes drawn from the inverter circuit 10. This transformer has a primary winding 32a and a number of secondary windings two of which are shown and identified as windings 32b and 32c. Twice this number of secondary windings are utilized where the drive circuit of the transistor 4 operates on a full wave rather than a half wave basis. The secondary winding 32b is shown connected by a line 35 to the input of impedance means 20 which is a variable impedance means connected between the switch means 17 and the lines 19–19' extending to the inverter circuit output. The amount of drive power supplied to the gating transistor 4 when the switch means 17 is closed is dependent upon the value of the variable impedance means 20. The variable impedance means 20 responds to the level of the output load current by varying the value of the impedance means 20 to increase the drive power for the gating transistor 4 for higher load currents.

The secondary winding 32c is shown connected by a line 37 to the variable phase control means 24 where it acts as a secondary level of control upon the phase of the output of the variable phase control means 24. This current feedback to the variable phase control means 24 controls to some extent the amplitude of the inverter circuit output by varying the conducting time of the gating transistor. At higher load currents, the voltage drop in the load current carrying components connected between the inverter circuit output and the load supplied by the circuit of FIG. 2 increases and the current feedback increases the output of the inverter circuit with load current to make up for this voltage drop. The current feed back to the variable impedance means 20, on the other hand, does not have any effect on the gating duration of the transistor 4 but rather makes available a greater driving power to increase efficiency of operation of the system at higher load currents.

To the end of increasing directly the drive power to the inverter circuit 10 for higher load currents, in a manner to be more fully explained, a second current transformer 38 is shown in FIG. 2 having a primary winding 38a connected to carry load current from the inverter current from the inverter circuit 10 and a secondary winding 38b which is connected directly to the inverter circuit 10.

In the forms of the inventions shown in FIGS. 1 and 2 it should be noted that the gating transistor 4 (or other current control device to be used instead) isolates the inverter circuit 10 and the load thereof from the battery source 2, so that sudden increases in the voltage which might appear in the input to the transistor 4 will be decoupled from the inverter circuit 10 and its load by the resulting non-conduction of the transistor 4 for the period of the excessive voltage. It should be further noted that, as the input voltage supplied by the battery 2 increases, the drive power for the transistor 4 decreases and vice versa. This circuit operation results in a consistent high efficiency for widely varying input voltages.

Refer now to FIGS. 3 and 3A which show the preferred circuitry for the form of the invention shown in FIG. 2. The various circuit elements which together form a circuit component represented by one of the boxes in FIG. 2 have been given the same basic reference numerals as the corresponding box, and include additional element distinguishing reference numerals following a dash placed thereafter.

As previously indicated, the drive voltage for the gating transistor 4 is obtained from the output of the inverter circuit 10. The inverter circuit 10, which will be described in detail hereinafter, has an output transformer generally indicated by reference numeral 10–1. This transformer has a core with a rectangular hysteresis characteristic. The various windings of this transformer will be identified by the base reference numeral 10–1 followed by an alphabet character identifying the particular winding involved. Each of these windings will have a voltage induced therein which is substantially a square wave where the half cycles of opposite polarity are approximately one-half cycle or 180° in duration. Dots are positioned at the ends of the windings which have the same polarity or phase at a given instant. Thus, the ends of the windings which have the dots will be of either positive or negative polarity with respect to the opposite ends thereof at any given instant. This polarity will reverse during the next half cycle of the inverter output. In order to avoid the use of too many long lines interconnecting the base electrode circuit of the transistor 4 with the output of the inverter circuit 10, many of the secondary windings (10–1b, 10–1b', 10–1c and 10–1c') of the transformer 10–1 have been physically located adjacent the transistor 4 rather than next to the lines indicating the core of the transformer 10–1 as are some of the other secondary windings thereof.

The biasing means 8 in FIG. 2 is formed by a full wave rectifier circuit including secondary windings 10–1b and 10–1b' of the output inverter transformer 10–1. The dotted end of the winding 10–1b and the undotted end of the secondary winding 10–1b' are connected to the positive line 21 extending to the emitter electrode of the transistor 4. The opposite ends of these windings are respectively connected to the anode terminals of semiconductor rectifiers 8–1 and 8–1'. The cathode terminals of these rectifiers are connected through resistors 8–2 and 8–2' to a common line leading to the base electrode of the transistor 4. It is thus apparent that during each half cycle of the inverter output, a positive voltage will be coupled to the base electrode of the transistor 4 to render the same normally non-conductive in the absence of other voltages in the base circuit of the transistor 4. When the latter voltages are present, as will appear from an explanation to follow, the rectifiers 8–1 and 8–1' will be blocked and a negative voltage will be applied between the base and emitter electrodes 4c and 4a across a resistor 40 which bypasses the rectifiers 8–1 and 8–1'. This results in flow of base current and high conduction of the transistor 4.

Switch means 17 controls the coupling of the drive current to the base electrode 4c and in its most preferred form is a full wave rectifier circuit associated with secondary windings 10–1c and 10–1c' of the inverter output transformer 10–1. The dotted end of the winding 10–1c and the undotted end of the winding 10–1c' are connected to the line 21 extending to the emitter electrode of the transistor 4. The opposite ends of these windings are respectively connected through current-limiting resistors 20–1 and 20–1' forming part of the variable impedance means 20 to the cathode electrodes of a pair of gated diodes 17–1 and 17–1'. As previously indicated, gated diodes are the semiconductor equivalents of thyratron tubes. In order to increase the speed of switching the gated diodes 17–1 and 17–1' on and off, bypass capacitors 20–2 and 20–2' are connected across the resistors 20–1 and 20–1'. The anode terminals of the gated diodes 17–1 and 17–1' are connected to the base electrode 4c of the gating transistor 4.

It is apparent that the gated diodes 17–1 and 17–1' are alternately prepared for firing when the phase of the voltage induced in the transformer windings 10–1c and 10–1c' is such as to feed a negative voltage to the cathode terminals thereof. The gated diode which is prepared for firing at any instant will be fired or triggered into a highly conductive state if a triggering signal is simultaneously applied to the control terminal thereof, as is well known in the art. The negative voltage coupled through the conductive gated diode will overcome the bias potential previously described and effect conduction of the gating transistor 4 for the remainder of the half cycle involved.

During the next half cycle, the polarity of the voltages induced in the winding 10–1c or 10–1c' associated with the fired gated diode will reverse, to render the latter diode non-conductive and prepare the former gated diode for firing.

The use of gated diodes and the square wave form of the voltages induced in the inverter circuit transformer windings 10–1c and 10–1c' are instrumental in rapidly switching the gated diodes and the transistor 4 between non-conductive and conductive conditions.

The variable phase control means 24 is a variable phase pulse generating circuit which, in the preferred form of the invention, includes a magnetic core unit having gating windings 24–1 and 24–1' and control windings 24–2, 24–2' and 24–3. These windings, like the windings of transformer 10–1, are wound upon a core 24–5 having a rectangular hysteresis characteristic. When the core is unsaturated the impedance of the gating windings will be high and when the core is saturated the impedance of the gating windings will be low. Dots are positioned adjacent one of the ends of each of the various windings of the magnetic core unit to indicate the direction of the magnetomotive force produced by current flow therein. Current flow into the dotted ends of the windings will produce a magnetomotive force in one direction in the core and flow of current out of the dotted ends of the windings will produce a magnetomotive force in the opposite direction in the core.

The dotted ends of the gating windings 24–1 and 24–1' are respectively connected to the base electrode of the gating transistor 4. The opposite ends of these windings are respectively connected to the anode terminals of a pair of rectifiers 24–4 and 24–4'. The cathode terminals of these rectifiers are respectively connected in series with the voltage generated in the inverter output transformer windings 10–1c and 10–1c' by circuit means including resistors 24–5 and 24–5' and connections 28 and 28' extending to the bottom ends of the resistors 20–1 and 20–1'. It is thus apparent that, when the ends of the transformer windings 10–1c and 10–1c' nearest the rectifiers 24–4 and 24–4' are negative (which occurs during alternate half cycles), a relatively high current can flow through the rectifiers 24–4 and 24–4' provided the gating windings 24–1 and 24–1' are in their low impedance conditions. The rectifiers 24–4 and 24–4' limits the direction of current flow through the gating windings 24–1 and 24–1' to a direction which produces a magnetomotive force in the associated core 24–5 which opposes the magnetomotive force produced by the D.C. control current flowing in the control windings 24–2 and 24–2'. When a negative D.C. voltage is applied to the gating windings through the rectifiers 24–4 and 24–4', the core 24–5 will become saturated after a given time interval which is a function of the magnitude of the D.C. current flowing through the control windings 24–2 and 24–2' which tend to oppose this saturation. The greater the saturation opposing current flowing through these control windings, the longer it will take the core to saturate.

It can thus be seen that by varying the flow of current in the control windings 24–2 and 24–2' with the voltage conditions in the output of the inverter circuit, the timing of the saturation of the core of the magnetic core unit referred to is also varied. As soon as the core is saturated, substantial current begins to flow through the rectifier 24–4 or 24–4' and associated resistor 24–5 or 24–5'. The control terminals of the associated gated diodes 17–1 and 17–1' are respectively connected to the bottom ends of the resistors 24–5 and 24–5', and so the gated diode which is prepared for high conduction at any instant will be triggered when the core 24–5 becomes saturated. The core becomes unsaturated, of course, when the voltage in the inverter circuit transformer reverses in polarity.

The non-corresponding ends of the control windings 24–2 and 24–2' are connected together and the other ends of these windings respectively are connected by conductors 41 and 42 to the comparator circuit 22. The comparator circuit 22 is a full wave rectifier and bridge circuit (FIG. 3A). A pair of rectifiers 22–1 and 22–1' are connected to the opposite ends of a center tapped secondary winding 10–1d of the inverter output transformer 10–1. The cathode terminals of these rectifiers are connected to the juncture of a pair of resistors 22–3 and 22–5 forming two arms of a bridge circuit. A filter capacitor 22–2 is connected between the rectifier cathode terminals and the center tap of the winding 10–1d. The other two arms of the bridge circuit are respectively formed by a resistor 22–4 and a Zener diode 23 which constitutes the reference voltage means 23 previously referred to. The transformer winding 10–1d has a center tap which is connected to the juncture of the Zener diode 23 and the resistor 22–4. The Zener diode establishes a fixed voltage at the point of the bridge circuit adjacent the cathode terminal thereof. The line 41 extending from the dotted end of the series connected control windings 24–2 and 24–2' are connected to this point. The conductor 42 leading to the opposite end of the series connected control windings is connected to the juncture of the resistors 22–3 and 22–4. It is thus apparent that the current flowing in the conductors 41–42 is a function of the degree of unbalance of the bridge circuit which is a measure of the difference between the amplitude of the output of the inverter circuit and the reference voltage established by the Zener diode.

The bridge circuit is designed so that an increase in the amplitude of the inverter circuit output from a reference value will result in an increase in the flow of current through the control windings 24–2 and 24–2'. This will have the effect of increasing the firing angle of the gated diodes which will decrease the conducting intervals of the gating transistor 4 to thereby reduce the amplitude of the input supply voltage and the amplitude of the A.C. output of the inverter circuit.

The control winding 24–3 (FIG. 3) is associated with the current feedback circuit previously referred to. The dotted end of the winding 24–3 is connected through a resistor 24–6 to a conductor 37' and the undotted end of the control winding 24–3 is connected to a conductor 37. A capacitor 24–7 is connected between the undotted end of the control winding 24–3 and the end of the resistor 24–6 remote from the control winding. The conductor 37' extends to the cathode terminals of a pair of diodes 43 and 43' (FIG. 3A) connected to opposite ends of the secondary winding 32c of the current transformer 32 previously referred to. The winding 32c has a center tap point which is connected to the conductor 37. It is thus apparent that, as the average level of the current in the primary winding of the current transformer 32 increases, the current flow in the control winding 24–3 will accordingly increase, and this current increase will decrease the firing angle of the gated diodes 22–1 and 22–1' since the magnetomotive force produced by this current opposes the magnetomotive force produced by the current in the control windings 24–2 and 24–2'. Thus, an increase in load current will increase the conducting intervals of the gating transistor 4 to increase the amplitude of the output voltage of the inverter to overcome the voltage drop in the power supply output and load circuit due to the increase flow of current.

The output from the inverter circuit which supplies the current to the main output of the power supply circuit is taken from the secondary winding 10–1e (FIG. 3A) of the inverter output transformer 10–1. The dotted end of the transformer winding 10–1e is connected in series with the primary winding 38a of the current transformer 38 and the primary winding 32a of the current transformer 32. The undotted end of the transformer winding 10–1e is connected in series with the primary winding 38a' of the current transformer 38 and the primary winding 32a' of the current transformer 32. Two primary windings are utilized instead of one for the current transformers 38 and 32 due to the full wave connections of the inverter circuit output to be described in FIG. 3A.

It should be noted that in the form of the invention shown in FIGS. 3 and 3A that both positive and negative voltages with respect to ground are available respectively on output terminals T1 and T2. To this end, the right hand end of the primary winding 32a is connected through rectifier 12–2 arranged to pass a positive voltage to the terminal T1 and through an inversely connected rectifier 12–1 arranged to pass a negative voltage to the negative output terminal T2. The right hand end of the primary winding 32a' is connected to a rectifier 12–2' arranged to pass a positive voltage to the positive terminal T1, and to an inversely connected rectifier 12–1' arranged to pass a negative voltage to the negative terminal T2. A filter capacitor 12–3 is connected between the positive terminal T1 and a ground reference terminal T3, and a filter capacitor 12–3' is connected between the negative terminal T2 and the reference terminal T3. It is thus apparent that the current will flow through at least one of the primary windings of the transformers 32 and 38 during each half cycle of the inverter circuit output.

It will be recalled that current feedback is provided to the base circuit of the transistor 4 to increase the average drive power when the load current is at a relatively high level. To this end, the aforementioned resistor 20–1 and 20–1' in series with the gated diodes 17–1 and 17–1' (FIG. 3) are respectively shunted by circuits including gated diodes 20–3 and 20–3' and resistors 20–4 and 20–4'. The cathode terminals of the gated diodes 20–3 and 20–3' are connected to the upper ends of the resistors 20–1 and 20–1' so that upon the triggering of the gated diodes 20–3 or 20–3' (and the main gated diodes 17–1 and 17–1') the current flow in the base circuit of the transistor 4 will be increased over what it would be in the absence of the conduction of the gated diode 20–3 or 20–3'. The gated diodes 20–3 or 20–3' are rendered conductive only when the current flowing in the output of the power supply circuit exceeds a given minimum level. To this end, the control terminal of the gated diode 20–3 is connected through a resistor 20–5 to a conductor 35–2 extending to the left hand or undotted end of the secondary winding 32b of the current transformer 32. The dotted or right hand end of the latter winding is connected by conductor 35–3 to the cathode terminal of the gated diode 20–3. The resistor 20–5 establishes the value of the current which must flow in the primary winding 32a of the current transformer 32 to provide sufficient drive power for triggering the gated diode 20–3.

A similar circuit is associated with the gated diode 20–3'. This circuit includes a current level establishing resistor 20–5' extending to a conductor 35–2' connected to the left hand or dotted end of the secondary winding 32' of the current transformer 32. The opposite end of the latter winding is connected by a conductor 35–3' to the cathode terminal of the gated diode 20–3'. When the current is above the set level for operating the gated diodes 20–3 or 20–3', it is apparent that the gated diode involved will be rendered conductive when the associated gated diodes 17–1 or 17–1' is rendered conductive. The gated diodes 20–3 and 20–3' will be rendered non-conductive by the reversal of the voltage in the associated windings 10–1c or 10–1c' in the same manner as the gated diodes 17–1 and 17–1' are rendered non-conductive.

Starting switch means referred to in FIG. 1 includes a PNP transistor 14–2 and a NPN transistor 14–1. The emitter electrode 14–2a of the transistor 14–2 is connected to the line 21 extending to the positive terminal of the battery 2, and the collector electrode 14–2b thereof is connected through a resistor 14–3 to the base electrode 14–1a of the transistor 14–1. The base electrode 14–1a is connected to ground by a resistor 14–4. The collector electrode 14–1b of the transistor 14–1 is coupled through a resistor 14–5 to the base electrode 4c of the gating transistor 4. The emitter electrode 14–1c of the transistor 14–1 is grounded.

The base electrode 14–2c of the transistor 14–2 receives drive power from a circuit including a resistor 14–6 connected between the positive input line 21 and the base electrode 14–2c of the transistor 14–2, and a resistor 14–8 connected between the latter base electrode and ground.

When the line switch 3 associated with the battery supply 2 is initially closed, a positive voltage will be applied to the base electrode 14–2c of the transistor 14–2 by the voltage divider formed by resistors 14–6 and 14–8, which results in a large current flow through the transistor 14–2 which flows through the resistors 14–4 and 14–3. The resulting positive voltage developed across resistor 14–4 will render the NPN transistor 14–1 highly conductive. The emitter to collector current flowing in the transistor 14–1 under these circumstances will flow through resistor 14–5 and then through the base-emitter electrode of the gating transistor 4 to supply drive power for the latter transistor. This drive power is sufficient to start the inverter circuit 10 oscillating to provide the square wave output previously referred to.

The starter circuit disable means 18 includes a pair of rectifiers 18–1 and 18–1' respectively connected to the bottom ends of the inverter circuit transformer windings 10–1b and 10–1b'. The latter rectifiers are arranged to pass the positive half cycles of the square wave voltage induced in these windings. The rectifiers 18–1 and 18–1' form a full wave rectifier circuit which supply this positive potential each half cycle of the inverter output to the base electrode 14–2c of the transistor 14–2 through a line 18–2 and current-limiting resistor 18–3. A filter capacitor 18–4 is connected between the line 18–2 and the positive line 21. The positive voltage fed to the base electrode 14–2c of the transistor 14–2 once the inverter circuit becomes operating will render the transistor 14–2 non-conductive. The resulting loss of driving current for the transistor 14–1 will effectively render the transistor 14–1 non-conductive.

The filter circuit means 6 in FIG. 3A comprises a choke 6–1 connected to the collector electrode 4b of the gating transistor 4, and a filter capacitor 6–3 connected between the output side of the choke 6–1 and ground. A rectifier 6–2 for grounding positive voltages is coupled between the input side of the choke 6–1 and ground.

The inverter circuit 10 includes a pair of PNP power transistors 10–2 and 10–2'. The emitter electrodes of these transistors are connected to a common line 10–3 leading to the output of the filter circuit 6. The collector electrode of the transistors 10–2 is connected to the upper end of the primary winding 10–1a of the inverter transformer 10–1 and the collector electrodes of the transistor 10–2' is connected to the bottom end of the primary winding 10–1a. The primary winding 10–1a has a center tap connected to ground. It is apparent that when the transistor 10–2 is conducting, current flows in one direction through the primary winding 10–1a to the center tap point thereof, and when the other transistor 10–2' is conducting, current flows in the opposite direction through the primary winding 10–1a. The transistors 10–2 and 10–2' are rendered alternately conductive by control circuits associated with the base electrodes of the aforementioned transistor. To this end, the base electrode of the transistor 10–2 is connected through a resistor 10–4 in parallel with a capacitor 10–5 to the bottom end of a feedback winding 10–1f of the transformer 10–1. The other end of the transformer winding 10–1f is connected through a rectifier 10–6 to the output of the filter circuit 6.

In a like manner, the base electrode of the transistor 10–2' is connected through a resistor 10–4' in parallel with a capacitor 10–5' to the upper end of a feedback winding 10–1f'. The other end of the winding 10–1f' is connected through the rectifier 10–6 to the filter circuit 6.

A feedback winding 10–1g is provided on the transformer 10–1 which winding has a bottom end connected through a saturable choke 10–7 to the base electrode of transistor 10–2. The saturable choke is designed to saturate prior to the core of transformer 10–1. The various connections described connecting the feedback windings 10–1f, 10–1g and 10–1f' and the saturable choke 10–7 form a loop circuit where the voltages induced in the feedback windings are always in additive relationship.

The first transistor to conduct will result in a flow of current through the primary winding 10–1a which will induce a voltage in the associated feedback winding 10–1f or 10–1f' which will maintain conduction of the conducting transistor and in the other feedback winding which will prevent the other transistor from conducting. When the choke 10–7 finally saturates, the conducting states of the transistors 10–2 and 10–2' are reversed to initiate a new half cycle of the multivibrator circuit which last until the choke again saturates.

As previously indicated, current feedback is provided to the inverter circuit 10 in order to increase the drive current in proportion to the current demands on the inverter circuit. To this end, a pair of PNP control transistors 10–8 and 10–8' are provided for varying the drive current to the transistors 10–2 and 10–2'. The collector electrode of the transistor 10–8 is coupled by a conductor 50 to the right hand end of the secondary winding 38b of the current transformer 38. The other end of the latter transformer winding is connected through a resistor 10–9 in parallel with a capacitor 10—10 to ground. The emitter electrode of the transistor 10–8 is connected to the end of a transformer winding 10–1h of the transformer 10–1 which is positive with respect to the other end thereof when the associated transistor 10–2 is conducting. The other end of the transformer winding 10–1h is connected through a resistor 10–11 in parallel with a capacitor 10–13 to the base electrode of the transistor 10–8. A conductor 10–15 interconnects the emitter electrode of the transistor 10–8 with the base electrode of the inverter transistor 10–2.

The collector electrode of the other transistor 10–8' is connected by a conductor 50' to the right hand end of the secondary winding 38b' of the current transformer 38. The left hand end of the latter winding is connected through a resistor 10–9' in parallel with a capacitor 10–10' to ground. The emitter electrode of the transistor 10–8' is connected to the end of a transformer winding 10–1h' which is positive with respect to the other end thereof when the associated transistor 10–2' is conducting. The other end of the transformer winding 10–1h' is connected through a resistor 10–11' in parallel with a capacitor 10–13' to the base electrode of the transistor 10–8'. A conductor 10–15' connects the emitter electrode of the transistor 10–8' to the base electrode of the transistor 10–2'.

During alternate half cycles of the inverter circuit output, the polarity of the voltage induced in the current transformer windings 38b and 38b' is such that the associated transistors 10–a and 10–a' are able to conduct readily to contribute to the base current of the associated transistors 10–2 and 10–2'. The contribution to the base current of the latter transistors is a function of the magnitude of the voltage induced in the current transformer windings 38b and 38b' which, in turn, depends upon the magnitude of the load current in the power supply circuit. The voltage induced in the transformer windings 10–1h and 10–1h' associated with the base electrode of the transistors 10–8and 10–8' aid in the fast switching thereof between conducting and non-conducting conditions which occur simultaneously with the triggering of the associated transistors 10–2 and 10–2' between their conducting and non-conducting conditions.

The present invention has thus provided an extremely highly efficient power supply circuit wherein a D.C. power source is utilized to provide either a regulated positive or negative potential with respect to ground, or a regulated A.C. sinusoidal signal of relatively fixed magnitude with a very wide fluctuation of the D.C. input supply voltage. The relationship of the gating transistor 4 (or other current control device) to the inverter circuit is such that very high efficiencies are obtained and sudden substantial increases of the D.C. input supply voltage which could damage the transistors in the inverter or the load circuits are decoupled therefrom by the gating transistor 4.

It should be understood that numerous modifications may be made in the preferred forms of the invention described above without deviating from the broader aspects of the invention.

What I claim as new and desire to protect by Letters Patent of the United States is:

1. A regulated power supply circuit comprising: a source of D.C. energizing voltage, an inverter circuit having an input to which D.C. energizing current is fed and an output having an output at which a square wave A.C. voltage of a given frequency is developed by the inverter circuit, the amplitude of the A.C. voltage being a function of the magnitude of the D.C. voltage fed to the input thereof, a current control device having load terminals and a control terminal which renders said load terminals relatively conductive and non-conductive in accordance with the polarity of a control signal fed thereto, filter circuit means for converting a pulsating D.C. to a relatively stabilized D.C. and having an output connected to the input of said inverter circuit, means connecting said load terminals of said current control device in series between said source of D.C. energizing voltage and the input of said filter circuit means, means connecting the output of said filter circuit means to the input of said inverter circuit, whereby the D.C. voltage fed to the latter input is a function of the time said current control device is in a conductive state, a gated diode having anode, cathode and control terminals, means connecting said output of said inverter circuit in series between said control terminal of said current control device and the anode and cathode terminals of said gated diode to pass a conduction producing voltage to the control terminal of said current control device to effect conduction thereof during alternate half cycles of said inverter circuit output when the gated diode is triggered into conduction, and control means responsive to the output of the inverter circuit for generating variable phase triggering pulses during alternate half cycles of the inverter circuit output and feeding said triggering pulses to the control terminal of the gated diode to trigger the same at a frequency related to the frequency of the output of the inverter circuit which effect a highly conductive state thereof, said control means including means responsive to the output of the inverter circuit for varying the phase of said triggering pulses to vary the timing of the triggering of said gated diode to maintain the amplitude of the inverter circuit output substantially constant.

2. A regulated power supply circuit comprising: a source of D.C. energizing voltage, an inverter circuit having an input to which D.C. energizing current is fed and an output section comprising an output transformer having a number of output windings in which square wave A.C. voltage of a given frequency is developed by the inverter circuit, the amplitude of the A.C. voltage being a function of the magnitude of the D.C. voltage fed to the latter input is a function of the time said load load terminals and a control terminal which renders said load terminals relatively conductive and non-conductive in accordance with the polarity of a control signal fed thereto, filter circuit means for converting a pulsating D.C. to a relatively stabilized D.C. and having an output connected to the input of said inverter circuit, means connecting said load terminals of said current control device in series between said source of D.C. energizing voltage and the input of said filter circuit means, means connecting the output of said filter circuit means to the input of said inverter circuit, whereby the D.C. voltage fed to the latter input is a function of the time said load terminals of said current control device are in a conductive state, biasing means for normally feeding a D.C. cut-off voltage to the control terminal of said current control device to render the load terminals thereof non-conductive, and including a rectifier and one of said transformer windings connected in series between said control terminal and one of said load terminals to pass a D.C. cut-off voltage to said control terminal during alternate half cycles of said inverter circuit output, a gated diode having control, anode and cathode terminals, one of said transformer windings being connected in series between said control terminal of said current control device and the anode and cathode terminals of said gated diode to pass a bias overcoming voltage to the control terminal of said current control device to effect a conduction thereof during alternate half cycles of said inverter circuit output when the gated diode is triggered into conduction, and control means responsive to the output of the inverter circuit for generating variable phase triggering pulses during alternate half cycles of the inverter circuit output and feeding said triggering pulses to the control terminal of the gated diode to trigger the same during the half cycles of the A.C. voltage in the associated transformer winding which effect a highly conductive state thereof, said control means including means responsive to the output of the inverter circuit for varying the phase of said triggering pulses to vary the timing of the triggering of said gated diode to maintain the amplitude of the inverter circuit output substantially constant.

3. A regulated power supply circuit comprising: a source of D.C. energizing voltage, an inverter circuit having an input to which D.C. energizing current is fed and an output section comprising an output transformer having a number of output windings in which square wave A.C. voltage of a given frequency is developed by the inverter circuit, the amplitude of the A.C. voltage being a function of the magnitude of the D.C. voltage fed to the input thereof, a current control device having load terminals and a control terminal which renders said load terminals relatively conductive and non-conductive in accordance with the polarity of a control signal fed thereto, filter circuit means for converting a pulsating D.C. to a relatively stabilized D.C. and having an output connected to the input of said inverter circuit, and means connecting said load terminals of said current control device in series between said source of D.C. energizing voltage and the input of said filter circuit means and the output of said filter circuit means to the input of said inverter circuit, whereby the D.C. voltage fed to the later input is a function of the time said load terminals of said current control device are in a conductive state, parallel branch circuits connected between the control terminal and one of said load terminals of said current control device, each of the branch circuits including a gated diode having cathode, anode and control terminals and one of said transformer windings connected in series between said control terminal of said current control device and the anode and cathode terminals of said gated diode to pass a voltage to the control terminal of said current control device to effect conduction thereof during alternate half cycles of said inverter circuit output when the gated diode is triggered into conduction, the transformer windings being oppositely connected in said branch circuits to effect conduction of said gated diodes during different half cycles of the inverter circuit output and control means responsive to the output of the inverter circuit for generating a first set of variable phase triggering pulses during alternate half cycles of the inverter circuit output and a second set of variable phase triggering pulses during the intervening half cycles of said inverter circuit output, means respectively feeding said sets of triggering pulses to the control terminals of the gated diodes to trigger the same during the half cycles of the A.C. voltage in the associated transformer windings which effect a highly conductive state thereof, said control means including means responsive to the output of the inverter circuit for varying the phase of said triggering pulses to vary the timing of the triggering of said gated diodes to maintain the amplitude of the inverter circuit output substantially constant.

4. The power supply circuit of claim 1 wherein said control means further includes a rectifier, a saturable core device having a control winding, and a gate winding connected in series through said rectifier to said inverter circuit output, the control terminal of said gated diode being connected to receive a triggering pulsation when the core device is saturated, and means for feeding to said control winding a current which is dependent on the output of the inverter circuit and which flows in a direction which produces a magnetomotive force which opposes the magnetomotive force developed by the current flow in said gate winding.

5. The power supply circuit of claim 1 wherein there is provided variable impedance means in circuit with the flow of current through the anode and cathode terminals of said gated diode, and means responsive to the load current in the output of said inverter circuit for reducing the impedance of said variable impedance means to increase the average current flow through the gated diode when the load current exceeds a predetermined level.

6. A regulated power supply circuit comprising: a source of D.C. energizing voltage, an inverter circuit having an input to which D.C. energizing current is fed and an output section comprising an output transformer having a number of windings in which square wave A.C. voltage of a given frequency is developed by the inverter circuit, the amplitude of the A.C. voltage being a function of the magnitude of the D.C. voltage fed to the input thereof, a current control device having load terminals and a control terminal which renders said load terminals relatively conductive and non-conductive in accordance with the polarity of a control signal fed thereto, filter circuit means for converting a pulsating D.C. to a relatively stabilized D.C. and having an output connected to the input of said inverter circuit, means connecting said load terminals of said current control device in series between said source of D.C. energizing voltage and the input of said filter circuit means, means connecting the output of said filter circuit means to the input of said inverter circuit, whereby the D.C. voltage fed to the latter input is a function of the time said current control device is in a conductive state, a gated diode having anode, cathode and control terminals, one of said transformer windings being connected in series between said control terminal of said current control device and the anode and cathode terminals of said gated diode to pass a conduction producing voltage to the control terminal of said current control device to effect conduction thereof during alternate half cycles of said inverter circuit output when the gated diode is triggered into conduction, and control means responsive to the output of the inverter circuit for generating variable phase triggering pulses during alternate half cycles of the inverter circuit output and feeding said triggering pulses to the control terminal of the gated diode to trigger the same during the half cycles of the A.C. voltage in the associated transformer winding which effect a highly conductive state thereof, said control means including means responsive to the output of the inverter circuit for varying the phase of said triggering pulses to vary the timing of the triggering of said gated diode to maintain the amplitude of the inverter circuit output substantially constant.

7. A power inverter circuit comprising: a pair of semi-conductor switching devices each having a pair of load terminals and a control terminal, a source of direct current energizing voltage, a transformer having primary winding means coupled in series with the load terminals of said switching devices and said source of direct current voltage, means for rendering said switching devices alternately conductive, said transformer having additional secondary winding means and output winding means from which load current is extracted from the inverter circuit, and drive control means responsive to the current drain on the inverter circuit for varying the drive power to the control terminals of said switching devices in accordance with the power demands on the inverter circuit, said drive control means including first and second current control devices each having load terminals and a control terminal, the latter current control devices having their load terminals in series with the control terminals of said respective switching devices, to aid current flow in the latter control terminals, and means connecting said additional secondary winding means of said transformer to the control terminals of the current control devices of said drive control means to render the same alternately conductive and non-conductive along with the associated switching devices of the inverter circuit.

8. A power inverter circuit comprising: a pair of semiconductor switching devices each having a pair of load terminals and a control terminal, a source of direct current energizing voltage, a transformer having primary winding means coupled in series with the load terminals of said switching devices and said source of direct current voltage, means for rendering said switching devices alternately conductive, said transformer having output winding means from which load current is extracted from the inverter circuit, a current transformer having primary and secondary winding means, and drive control means responsive to the load current in the primary winding means of said current transformer for varying the drive power to the control terminals of said switching devices in accordance with the power demands on the inverter circuit, said drive control means including first and second current control devices each having load terminals and a control terminal, the latter current control devices having their load terminals in series with the control terminals of said respective switching devices, to aid current flow in the latter control terminals, and with the primary winding means of said current transformer for effecting current flow in said current control devices of said drive control means when the associated switching devices are conductive, and means connecting said additional secondary winding means of the first-mentioned transformer to the control terminals of the current control devices of said drive control means to render the same alternately conductive and non-conductive along with the associated switching devices of the inverter circuit.

9. A power inverter circuit comprising: a pair of semiconductor switching devices each having a pair of load terminals and a control terminal, a source of direct current energizing voltage, a transformer having primary winding means coupled in series with the load terminals of said switching devices and said source of direct current voltage, secondary winding means forming feedback winding means coupled to said control terminals to form a free running multivibrator inverter circuit where said switching devices are rendered alternately conductive, additional secondary winding means and output winding means from which load current is extracted from the inverter circuit, a current transformer having primary and secondary winding means, and drive control means responsive to the load current in the primary winding means of said current transformer for varying the drive power to the control terminals of said switching devices in accordance with the power demands on the inverter circuit, said drive control means including first and second semiconductor current control devices each having load terminals and a control terminal, the latter current control devices having their load terminals in series with the control terminals of said respective switching devices, to aid current flow in the latter control terminals and with the secondary winding means of said current transformer for effecting current flow in said current control devices of said drive control means when the associated switching devices are conductive, and means connecting said additional secondary winding means of the first-mentioned transformer to the control terminals of the current control devices of said drive control means to render the same alternately conductive and nonconductive along with the associated switching devices of the inverter circuit.

References Cited by the Examiner

UNITED STATES PATENTS

| | | | |
|---|---|---|---|
| 2,959,725 | 11/1960 | Younkin | 321—18 |
| 2,981,884 | 4/1961 | Tighe | 323—22 |
| 2,992,385 | 7/1961 | Lingle | 323—22 |
| 3,010,062 | 11/1961 | Van Emden | 321—18 |
| 3,119,056 | 1/1964 | Hatke | 321—18 X |

LLOYD McCOLLUM, *Primary Examiner.*

RALPH D. BLAKESLEE, *Examiner.*